United States Patent [19]

VanGorder et al.

[11] Patent Number: 5,009,066
[45] Date of Patent: Apr. 23, 1991

[54] AUTOMOTIVE POWER STEERING SYSTEM

[75] Inventors: David H. VanGorder, Saginaw; Kenny R. Wilson, Fairgrove, both of Mich.

[73] Assignee: General Motors Corporation, Detroit, Mich.

[21] Appl. No.: 434,394

[22] Filed: Nov. 13, 1989

[51] Int. Cl.⁵ .............................................. F16D 31/02
[52] U.S. Cl. ...................................... 60/415; 180/132; 60/329
[58] Field of Search ........................ 60/415, 413, 329; 180/132; 417/313

[56] References Cited

U.S. PATENT DOCUMENTS

| | | | |
|---|---|---|---|
| 2,290,479 | 7/1942 | Mercier | 60/416 |
| 2,896,733 | 7/1959 | Rockwell | 180/146 |
| 2,952,128 | 9/1960 | Highland | 137/587 |
| 3,152,448 | 10/1964 | Mercier | 60/572 |
| 3,323,305 | 6/1967 | Klees | 60/469 |
| 4,203,287 | 5/1980 | Bennett | 60/329 |
| 4,389,076 | 6/1983 | Ostwald | 303/116 |
| 4,664,155 | 5/1987 | Archung et al. | 60/415 |

FOREIGN PATENT DOCUMENTS 202164  11/1983  Japan ................................... 180/132

Primary Examiner—John T. Kwon
Assistant Examiner—F. Daniel Lopez
Attorney, Agent, or Firm—Saul Schwartz

[57] ABSTRACT

An automotive power steering system having a gas pressurized oil reservoir. A gas chamber is defined within the oil reservoir above the surface level of the oil therein. The surface level and volume of the gas chamber vary as the temperature of the oil changes. A cap on a fill port of the reservoir above the maximum oil level seals the gas chamber. A fill valve and a gas accumulator are connected to the gas chamber. The gas chamber is charged to a predetermined pressure above atmospheric pressure. As the oil heats up and the oil level in the reservoir rises, the volume of the gas chamber decreases. Gas is forced from the gas chamber to an expansible chamber of the accumulator to minimize the pressure increase in the gas chamber.

4 Claims, 1 Drawing Sheet

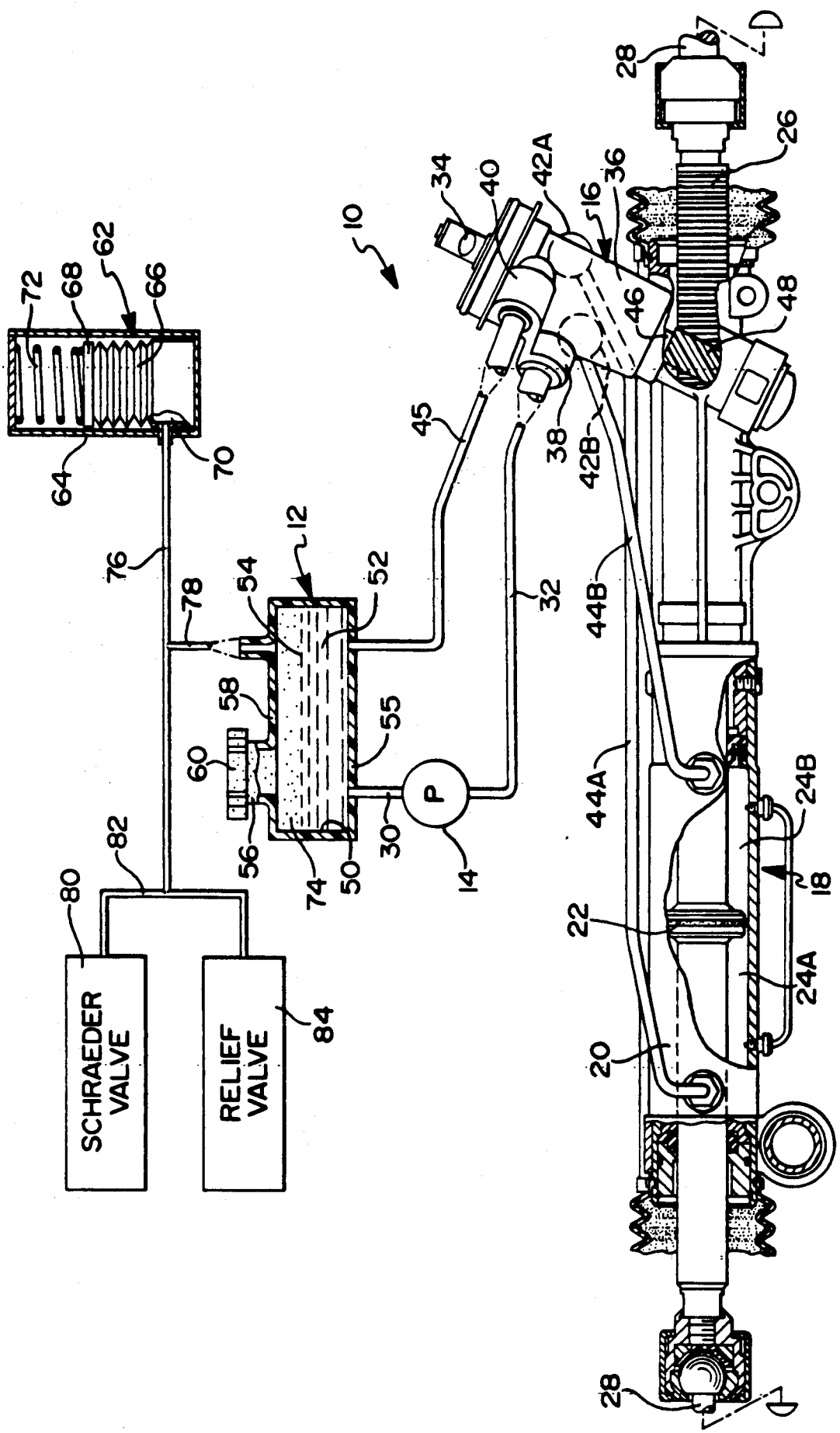

AUTOMOTIVE POWER STEERING SYSTEM

FIELD OF THE INVENTION

This invention relates to automotive power steering systems.

BACKGROUND OF THE INVENTION

Typical automotive power steering systems include a fluid reservoir, an engine driven pump, a servo-valve connected to the steering wheel, and a steering assist fluid motor. When the engine is on, the pump continuously circulates working fluid in a closed loop starting and ending at the reservoir. Because the fluid level in the reservoir varies normally from minimum when the fluid is cold, i.e. at ambient temperature, to a maximum when the fluid is hot, the reservoir fill cap is usually vented to the atmosphere. To avoid fluid leakage through the vent and to minimize cavitation at the pump inlet, closed or sealed power steering systems have been proposed. For example, U.S. Pat. N. 4203287, issued to J. L. Bennett and assigned to the assignee of this invention, describes a power steering system wherein the reservoir is a sealed, expansible chamber connected to the return line from the servo-valve to the pump. The fluid circuit, including the reservoir, is completely filled with fluid at atmospheric pressure when the fluid is cold. As the temperature of the fluid increases during operation, the volume of the expansible chamber expands to accommodate thermal expansion of the fluid. A power steering system according to this invention is a closed system wherein the fluid is pressurized for minimizing pump cavitation and wherein the fluid level in the reservoir is below a fill port for easy fluid replacement.

SUMMARY OF THE INVENTION

This invention is a new and improved automotive power steering system including a fluid reservoir, a pump, a servo-valve, and a steering assist fluid motor wherein the system is filled with hydraulic fluid to a level below a fill port in the reservoir for easy fluid replacement and the reservoir is gas pressurized to maintain an above-atmospheric pressure at the pump inlet to minimize cavitation. In the steering system according to this invention, the reservoir fill port is closed by a cover defining a gas-tight seal and the volume of the reservoir above the fluid level and a gas accumulator having an expansible chamber connected to the volume above the fluid in the reservoir are pressurized to above atmospheric pressure, the expansible chamber expanding as the fluid level in the reservoir rises with increasing fluid temperature to minimize the increase in gas pressure above the fluid. In a preferred embodiment of the power steering system according to this invention, the gas accumulator includes a housing remote from the reservoir, a bellows in the housing defining an expansible chamber connected to the volume in the reservoir above the fluid level and pressurized with air to above atmospheric pressure, and a spring between the accumulator housing and the bellows biasing the bellows against the air pressure therein.

BRIEF DESCRIPTION OF THE DRAWING

The single drawing FIGURE is a generally schematic representation of a power steering system according to this invention.

DESCRIPTION OF THE PREFERRED EMBODIMENT

Referring to the single drawing figure, an automotive power steering system 10 according to this invention includes a reservoir 12, a pump 14, a servo-valve 16 and a steering assist fluid motor 18. The fluid motor 18 is conventional and includes, briefly, a tubular housing 20 in which is slidably disposed a piston 22. The piston divides the housing into a pair of working chambers 24A-B on opposite sides thereof and is rigidly connected to a steering rack 26 disposed in the housing for reciprocation with the piston in the length direction of the housing. The opposite ends of the steering rack are connected to respective ones of a pair of tie rods 28 which, in turn, are connected to steering knuckles, not shown, of the vehicle on which the power steering system is mounted.

The pump 14 is a conventional engine driven power steering pump. The pump 14 has an inlet, not shown, connected to the reservoir 12 through a low pressure duct 30 and a discharge, not shown, connected to the servo-valve 16 through a high pressure duct 32.

The servo-valve 16 is a conventional open-center rotary steering control valve including an input or stub shaft 34 rotatably supported on a valve housing 36 integral with the fluid motor housing 20. The stub shaft 34 is adapted for rigid attachment to a steering wheel, not shown, of the vehicle on which the steering system is mounted. The valve housing 36 has an inlet port 38 to which the high pressure duct 32 is connected, a discharge port 40, and a pair of fluid motor ports 42A-B connected to respective ones of the fluid motor working chambers 24A-B through a pair of pressure pipes 44A-B. The discharge port 40 is connected to the reservoir 12 through a return duct 45.

The servo-valve further includes a pinion shaft 46 rotatably supported on the housing 36 having a pinion 48 thereon in mesh with rack teeth on the steering rack 26. A valve sleeve, not shown, of the servo-valve is rigidly connected to the pinion shaft 46 and has internal lands and grooves which cooperate with external lands and grooves on the stub shaft, not shown, in defining fluid flow paths through the servo-valve. The stub shaft is connected to the pinion shaft through a torsion bar, not shown, which centers the lands and grooves on the sleeve and the stub shaft relative to each other. In addition, the torsion bar permits limited relative rotation between the stub shaft and pinion shaft against the resilient resistance of the torsion bar for simulating road feel.

The reservoir 12 is preferably a hollow plastic shell the inside of which defines a reservoir chamber 50. A volume of hydraulic oil 52 is contained in the reservoir chamber 50 and has a surface level 54 which varies with operating conditions from a maximum level illustrated in the drawing figure to a minimum closer to a bottom wall 55 of the reservoir. The low pressure duct 30 opens into the reservoir chamber 50 at a location which is always below the surface level of the oil in the reservoir chamber, preferably through the bottom wall 55. The return duct 45 opens into the reservoir chamber 50 at any convenient location.

The power steering system 10 operates conventionally. When there is no steering input at the stub shaft 34, the open-center servo-valve 16 ports each of the working chambers 24A-B of the fluid motor 18 equally to the inlet and discharge ports 38-40 and fluid circulates at low pressure from the reservoir chamber 50, through the pump 14 and servo-valve 16, and back to the reservoir chamber. When a driver turns the steering wheel, relative rotation between the stub shaft 34 and the pinion shaft 46 progressively ports one of the working chambers 24A-B more to the inlet port 38 and the other of the working chamber more to the discharge port 40 so that a steering assist pressure difference develops across the piston 22 of the fluid motor.

The reservoir 12 has a fill port defined by a cylindrical neck 56 on a top wall 58 of the reservoir 12. The neck receives a cap 60 which seals the open end of the neck in gas-tight and fluid-tight fashion.

The steering system 10 further includes a remote, schematically illustrated gas accumulator 62. The accumulator 62 includes a housing 64 adapted for rigid attachment to the vehicle on which the steering system is mounted. A cylindrical bellows 66 is disposed in the housing 64 and has a reinforced upper wall 68. The interior of the bellows 66 defines an expansible chamber 70. A spring 72 bears against the reinforced upper wall 68 and biases the bellows in a direction corresponding to collapse of the expansible chamber 70.

The expansible chamber 70 is connected to a gas chamber portion 74 of the reservoir chamber 50 above the surface of the oil therein by a duct 76 and a first branch 78 therefrom which opens into the gas chamber portion of the reservoir chamber through the top wall 58 of the reservoir. A self-closing fill valve 80 like an ordinary tire inflation valve is disposed at the end of a second branch 82 from the duct 76 and a pressure relief valve 84 is disposed at the other end of the second branch.

The power steering system 10 is filled with hydraulic oil through the open neck 56 to the minimum or cold surface level, not shown, in the reservoir chamber. The cold surface level is above the bottom wall 55 of the reservoir so that the low pressure duct 30 is always below the oil surface level in the reservoir chamber. After the cap 60 is fitted onto the neck 56, the gas chamber portion 74 of the reservoir chamber and the expansible chamber 70 of the gas accumulator are charged with pressurized air through the fill valve 80 until the pressure in the gas chamber is about 10 psi. The pressure in the expansible chamber 70 reacts against the spring 72 and partly compresses the latter as the upper wall 68 rises in the housing 64.

When the pump 14 commences operation, the above atmospheric air pressure in the gas chamber portion 74 of the reservoir chamber 50 supercharges the inlet port of the pump 14 through the low pressure duct 30 and minimizes the likelihood of cavitation at high pump speeds. Concurrently, the oil temperature increases and the volume occupied by the oil similarly increases. The fluid surface level in the reservoir chamber 50 rises from the cold level to the maximum or hot level 54 illustrated in the drawing figure which maximum level is below the top wall 58 of the reservoir.

As the oil surface level rises, the volume of the gas chamber portion 74 decreases so that some of the air in the gas chamber portion 74 is forced through the first branch 78 and the duct 76 to the expansible chamber 70. The air forced into the expansible chamber reacts against the upper wall 68 and further compresses the spring 72 to increase the volume of the expansible chamber. Due to the compressibility of air, the decrease in the volume of the gas chamber portion 74 is not matched exactly by the increase in the volume of the expansible chamber 70. The two are, however, close enough so that air pressure on the surface of the fluid in the reservoir chamber increases at a rate dictated by the spring 72 which rate is calculated to confine the air pressure to a range not exceeding the capacities of the fluid seals of the steering system.

When fluid addition is required, the air pressure in the gas chamber portion 74 is simply relieved through the valve 80 and the cap 60 is removed. It is an important feature of this invention that when the cap is removed, the maximum level of fluid in the reservoir chamber is still well below the top of the neck 56 so that the potential for leakage from inside the reservoir is minimized. It is a further important feature of this invention that failure of the bellows 66 is accompanied only by loss of air pressure rather than loss of oil because the expansible chamber 70 contains only pressurized air.

The embodiments of the invention in which an exclusive property or privilege is claimed are defined as follows:

1. In an automotive power steering system including
   a pump,
   a servo-valve,
   a steering assist fluid motor,
   a reservoir having a reservoir chamber therein,
   a plurality of fluid ducts interconnecting said reservoir and said pump and said servo-valve and said fluid motor, and
   a volume of hydraulic oil in said power steering system establishing a fluid level in said reservoir chamber which varies between a minimum cold level when said working fluid is at a minimum operating temperature and a maximum hot level when said working fluid is at a maximum operating temperature and above which in said reservoir chamber is defined a gas chamber portion thereof,
   the improvement comprising:
   means defining a fill port on said reservoir opening into said reservoir chamber at a location above said maximum hot level of said hydraulic oil,
   a cover on said reservoir closing said fill port and defining a gas-tight seal between said reservoir and said cover to isolate said gas chamber portion from the atmosphere surrounding said reservoir,
   means connected to said reservoir for introducing into said gas chamber portion a quantity of gas under pressure to establish an above-atmospheric pressure in variable volume gas chamber portion, and
   a gas accumulator having an expansible chamber connected to said gas chamber portion,
   said expansible chamber expanding in response to decreases in the volume of said gas chamber portion resulting from thermal expansion of said hydraulic oil to thereby minimize the increase in gas pressure in said gas chamber portion.

2. The automotive power steering system recited in claim 1 wherein
   said gas in said variable volume gas chamber portion is air.

3. The automotive power steering system recited in claim 2 wherein said gas accumulator includes
   an accumulator housing,
   a cylindrical bellows in said accumulator housing having an upper wall and defining therein said expansible chamber, and
   resilient means between said accumulator housing and said upper wall biasing said upper wall in a direction corresponding to collapse of said expansible chamber.

4. The automotive power steering system recited in claim 3 wherein
   said resilient means is a spring between said accumulator housing and said upper wall.

* * * * *